Jan. 5, 1954   M. VUILLEUMIER   2,664,697
TIMEPIECE BEARING
Filed Feb. 25, 1953

Patented Jan. 5, 1954

2,664,697

UNITED STATES PATENT OFFICE 2,664,697

TIMEPIECE BEARING

Marcel Vuilleumier, Cully, Switzerland, assignor to Parechoc S. A., Le Sentier, Canton of Vaud, Switzerland, a firm of Switzerland Application February 25, 1953, Serial No. 338,835

Claims priority, application Switzerland June 9, 1952

3 Claims. (Cl. 58—140)

My invention has for its object and arrangement for setting the end-stone of a timepiece bearing on its carrier, said arrangement including a damping spring assuming the shape of a closed ring the inner periphery of which engages the end-stone while its outer periphery provided with at least one lug is fitted inside an annular groove of the carrier in a manner such that the ring may revolve round its axis, the groove being provided with a transverse inlet passage for the introduction of the lug. The outer periphery of the closed ring is provided with a hook engaging a cooperating spring assuming the shape of an open ring permanently housed inside the groove, said connection by means of a hook being such that the closed ring may without disengaging the open ring be shifted out of the groove and uncover the end-stone.

My present invention has for its object an improvement in such an arrangement, according to which at least the outer flange of said groove is provided in register with the hook with a gap that is diametrically opposed to the inlet provided for the lug, the angular opening of said gap being larger than that of said inlet so as to allow the hook to move freely when the lug has engaged its groove.

I have illustrated by way of example in accompanying drawings a preferred embodiment of my invention. In said drawings.

Figure 1:
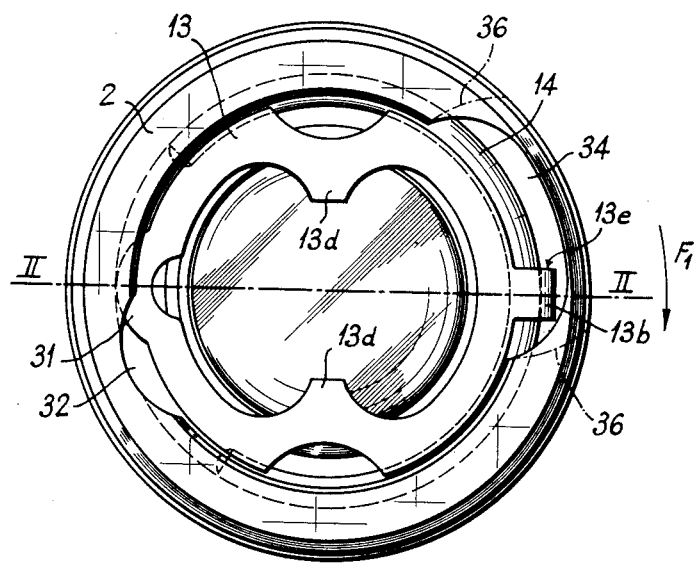
Fig. 1 is a plan view of said arrangement on an enlarged scale.
Figure 2:
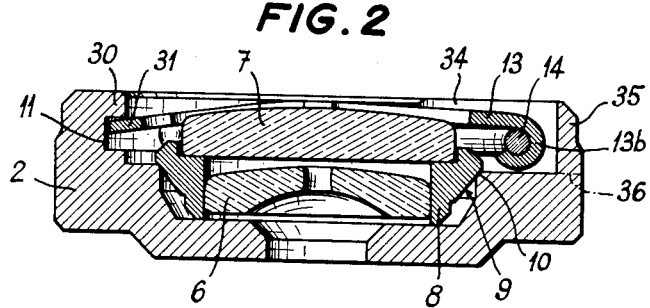
Fig. 2 is a diametrical cross section through line II—II of Fig. 1.

The cock or bracket that is not illustrated carries a bearing 2 inside which is housed a bezel 8 the conical bearing surface 9 of which rests on a seat 10 provided in the carrier 2. The balance staff that is not illustrated is revolubly carried in a throughstone 6 and abuts against an end-stone or jewel 7, said stones being both mounted inside the above mentioned bezel 8. The bearing 2 is provided with an annular groove 11 covered by an overhanging upper flange 30.

This groove 11 is intended for engagement by a shock-damping spring assuming the shape of a closed ring 13 carrying an outer lug 31 shaped so as to be capable of engaging a passage 32 cut in the overhanging flange 30 of the groove 11.

The damping spring is also provided with two inner projections 13d (Fig. 1) adapted to engage the upper surface of the jewel or end-stone 7 when the spring 13 is positioned and when the lug 31 thereon engages the groove 11. Said groove 11 serves also for housing an open ring 14 constituted by a spring wire. At a point diametrically opposed to the lug 31, the shock-damping spring 13 is provided with a depending hook 13b engaging the spring wire 14.

The groove 11 inside the carrier 2 opens, in a position diametrically opposed to the inlet passage 32 for the lug 31, into a gap 34 in the overhanging flange 30, the angular opening of said gap being substantially larger than that of the passage 32.

The mounting is performed as follows: the open ring spring 14 is first introduced into the hook 13b; then the spring ring 14 is inserted inside the groove 11 through a slight deformation thereof after which the spring 13 is laid over the end-stone 7, the lug 31 on the said spring 13 registering with the passage 32 provided therefor while the hook 13b registers substantially with the middle of the cut or gap 34. The lug 31 is depressed by means of a tool and a torque is then exerted on one side 13e on the hook 13d so as to angularly shift the spring 13 say into the direction of the arrow F1, whereby the lug 31 is brought underneath the solid part of the overhanging flange 30 covering the groove 11.

The different parts have thus entered the position illustrated in Fig. 1.

The angular shifting of the shock-damping ring 13 in the direction of the arrow F1 is stopped before the hook 13b engages a covered part of the groove 11 as the rotary shifting required for urging the lug 31 inside the groove 11 underneath the overhanging flange 30 is not large enough for also engaging the hook 13b inside said covered part of the groove.

According to a modification, the gap 34 may be formed not only inside the overhanging flange 30 but may extend also into the peripheral wall 35 of the groove 11 as shown by interrupted lines 36 in Fig. 1. The hook 13d may thus be taken hold of laterally from the outside.

What I claim is:

1. In a timepiece bearing, the provision of an end-stone, a damping spring assuming the shape of a closed ring the inner periphery of which engages the outer terminal surface of the end-stone, at least one radial lug rigid with the outer periphery of said spring, a bearing member for the end-stone, provided with an annular groove in its inner surface facing the end-stone, said damping spring being removably and revolubly fitted in the bearing member on the inside of said groove, a transverse passage being provided in the bearing member between the terminal surface of said bearing member and said groove to allow the lug to enter said groove through said passage, a hook-shaped part rigid with the outer periphery of the spring and angularly spaced with reference to said lug, a gap being provided in the bearing member at an angular distance from the said passage equal to that separating the lug from the hook on the spring and extending between the groove and the terminal surface of the bearing member over an angular distance that is larger than the angular opening of the said passage and inside which the hook is adapted to be shifted round the axis of the end-stone, an open ring-shaped spring fitted permanently inside the groove in the bearing member and engageable by the hook on the first spring to allow said first spring to be shifted forwardly away from the end-stone through a pivotal movement of the hook round the section of the second spring engaged thereby.

2. In a timepiece bearing, the provision of an end-stone, a damping spring assuming the shape of a closed ring the inner periphery of which engages the outer terminal surface of the end-stone, at least one radial lug rigid with the outer periphery of said spring, a bearing member for the end-stone, provided with an annular groove in its inner surface facing the end-stone, said damping spring being removably and revolubly fitted in the bearing member on the inside of said groove, a transverse passage being provided in the bearing member between the terminal surface of said bearing member and said groove to allow the lug to enter said groove through said passage, a hook-shaped part rigid with the outer periphery of the spring and angularly spaced with reference to said lug, a gap being provided in the bearing member at an angular distance from the said passage equal to that separating the lug from the hook in the spring and extending between the groove and the outside of the bearing member over an angular distance that is larger than the angular opening of the said passage and inside which the hook is adapted to be shifted round the axis of the end-stone, said gap connecting the groove freely with the outer periphery of the bearing member through the section of the bearing member lying to the front of a transverse plane registering substantially with the inner transverse wall of the groove, an open ring-shaped spring fitted permanently inside the groove in the bearing member and engageable by the hook on the first spring to allow the first spring to be shifted forwardly away from the end-stone through a pivotal movement of the hook round the section of the second spring engaged thereby.

3. In a timepiece bearing, the provision of an end-stone, a damping spring assuming the shape of a closed ring the inner periphery of which engages the outer terminal surface of the end-stone, a radial lug rigid with the outer periphery of said spring, a bearing member for the end-stone, provided with an annular groove in its inner surface facing the end-stone, said damping spring being fitted in the bearing member on the inside of said groove, in a manner such that it may revolve round its axis, a transverse passage being provided in the bearing member between the outside of said bearing member and said groove to allow the lug to enter said groove through said passage, a hook-shaped part rigid with the outer periphery of the spring and diametrically opposed to said lug, a gap being provided in the bearing member in diametrically opposite relationship with reference to the passage, said gap extending between the groove and the outside of the bearing member over an angular distance that is larger than the angular opening of the said passage and inside which the hook is adapted to be shifted round the axis of the end-stone, an open ring-shaped spring fitted permanently inside the groove in the bearing member and engageable by the hook on the first spring to allow the first spring to be shifted forwardly away from the end-stone through a pivotal movement of the hook round the section of the second spring engaged thereby.

MARCEL VUILLEUMIER.

References Cited in the file of this patent

UNITED STATES PATENTS

| Number | Name | Date |
| --- | --- | --- |
| 2,233,743 | Marti | Mar. 4, 1941 |
| 2,489,552 | Widmer-Steiner | Nov. 29, 1949 |